(12) United States Patent
Edlinger et al.

(10) Patent No.: US 6,506,288 B1
(45) Date of Patent: Jan. 14, 2003

(54) OPTICAL FILM MATERIAL ESPECIALLY $TIO_2$ OR $TA_2O_5$ OPTICAL WAVEGUIDE LAYER AND METHOD FOR PRODUCING SUCH

(75) Inventors: Johannes Edlinger, Feldkirch (AT); Eduard Kügler, Feldkirch (AT); Helmut Rudigier, Bad Ragaz (CH)

(73) Assignee: Unaxis Balzers Aktiengesellschaft, Balzers (LI)

( * ) Notice: Subject to any disclaimer, the term of this patent is extended or adjusted under 35 U.S.C. 154(b) by 0 days.

(21) Appl. No.: 08/702,841

(22) Filed: Aug. 26, 1996

Related U.S. Application Data

(63) Continuation of application No. 08/427,971, filed on Apr. 20, 1995, now abandoned, which is a continuation of application No. 08/210,958, filed on Mar. 21, 1994, now abandoned.

(30) Foreign Application Priority Data

Jan. 4, 1993 (CH) ............................................. 1005/93

(51) Int. Cl.$^7$ ............................................. C23C 14/35
(52) U.S. Cl. ............................ 204/192.26; 204/192.15; 204/192.27
(58) Field of Search ....................... 204/192.12, 192.15, 204/192.26, 192.27, 298.08, 192.13, 298.03

(56) References Cited

U.S. PATENT DOCUMENTS

| | | | |
|---|---|---|---|
| 4,497,700 A | | 2/1985 | Groth et al. .............. 204/192 P |
| 4,512,864 A | | 4/1985 | Gilley ..................... 204/192 P |
| 4,693,805 A | * | 9/1987 | Quazi ................ 204/298.08 X |
| 4,902,394 A | * | 2/1990 | Kenmotsu et al. .. 204/298.08 X |
| 4,963,238 A | * | 10/1990 | Siefkes et al. ...... 204/192.13 X |
| 5,126,033 A | | 6/1992 | Szezyrbowski et al. ..................... 204/298.08 |
| 5,169,509 A | | 12/1992 | Latz et al. .............. 204/298.03 |
| 5,192,894 A | * | 3/1993 | Teschner ........... 204/298.03 X |
| 5,292,417 A | | 3/1994 | Kugler .................. 204/192.13 |
| 5,295,220 A | | 3/1994 | Heming et al. ............. 385/142 |

FOREIGN PATENT DOCUMENTS

| | | |
|---|---|---|
| EP | 0430229 | 6/1991 |
| EP | 0567954 | 3/1993 |

OTHER PUBLICATIONS

Hard Materials in Optics Mar. 14–15, 90 pp. 75–79.
French Search Report for FR9403788.
J of Vac. Sc. & Tech 1984 pp. 1456–1460.
Variable refractive index . . . pp. 2194–2198 Ingrey et al, Applied Optics vol. 14, No. 9 9/75.
J. of Vac. Sc & Tech vol. 11, 1974 pp. 381–384.
J. of Electronic Materials 2/94 vol. 3 No. 1 pp. 37–50.
Surface & Coating Tech vol. 49 (1991) pp. 239–243.
Search Report of May 23, 1994 in GB 9405709.8.
European Search Report, Swiss No. 1005/93.
Article "Surface & Coatings technology" vol. 49, Nos. 1–3 Dec. 10, 1991.
Jour. of Vac. Science and Technology, vol. 11, 1974 pp. 381–384.
Applied Optics, vol. 14, No. 9, 9/75 pp. 2194–2198.
Journal of Electronic Materials, vol. 3, No. 1, 1974 pp. 37–50.
Proceedings of SPIE, vol. 1275 Hard Material pp. 74–79.
Journal of Vacuum Science & Technology A, vol. 2, No. 2 Apr.–Jun. 1984, Vacuum, Surfaces and Films pp. 1457–1460.

* cited by examiner

Primary Examiner—Steven H. VerSteeg
(74) Attorney, Agent, or Firm—Notaro & Michalos P.C.

(57) ABSTRACT

A method for producing a layer of a metal oxide with optical losses of 15 dB/cm, at most, for light with a wavelength of 633 nm, includes depositing the layer using magnetic field enhanced reactive DC-sputtering, from a metallic target.

20 Claims, 1 Drawing Sheet

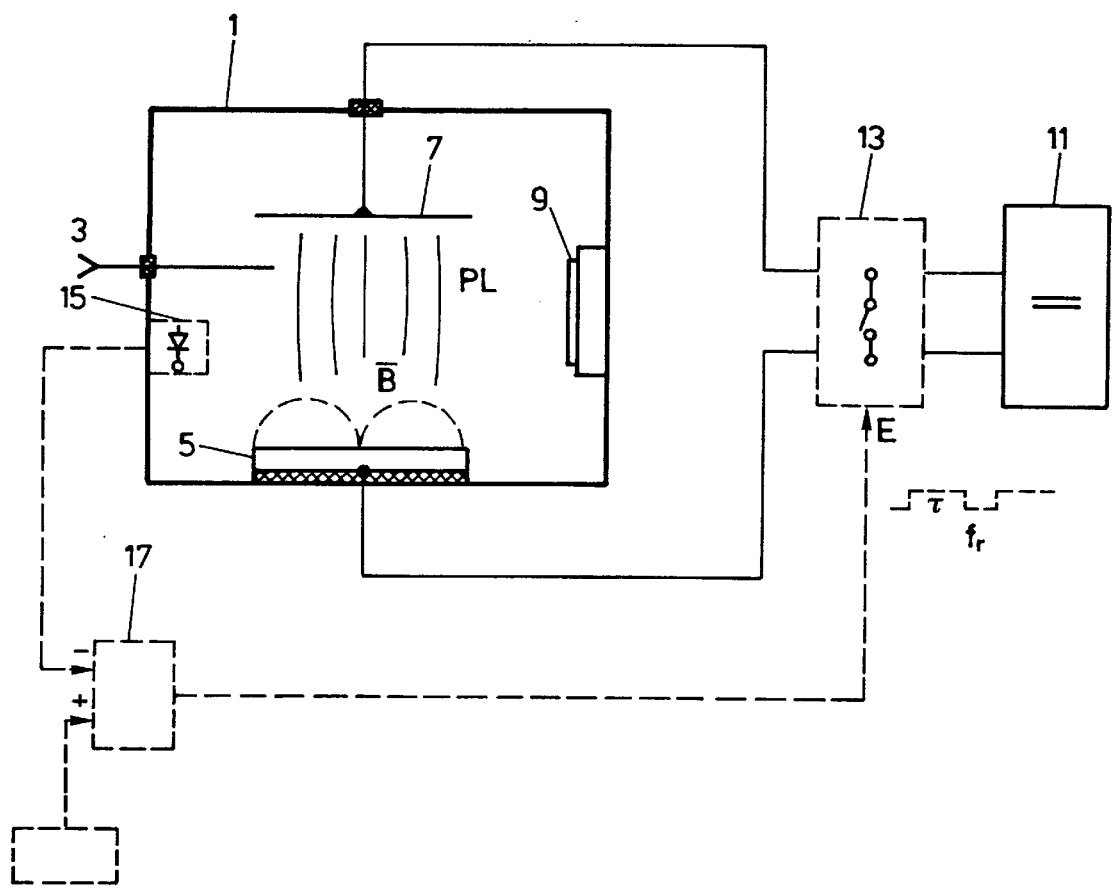

OPTICAL FILM MATERIAL ESPECIALLY TIO₂ OR TA₂O₅ OPTICAL WAVEGUIDE LAYER AND METHOD FOR PRODUCING SUCH

This application is a continuation of Ser. No. 08/427,971 filed Apr. 20, 1995, now abandoned which is a continuation of Ser. No. 08/210,958 filed Mar. 21, 1994, now abandoned.

BACKGROUND OF THE INVENTION

1. Field of the Invention

The present invention is generally directed to optical layer materials, especially for optical wavequide applications, and to the technique of producing such layers.

2. Description of Prior Art

The following prior art is considered:

(1) "Integrated Optics; Theory and Technology", R. G. Hunsperger, Springer-Verlag 1984;

(2) Arnold et al., "Thin solid films", 165, (1988), p. 1 to 9, "Ion beam sputter deposition of low loss $Al_2O_3$ films for integrated optics";

(3) Goell & Stanley, "Sputtered Glass Waveguides for Integrated Optical Circuits", in Bell Syst. Tech. J. 48, 3445 (1969);

(4) M. D. Himel et al., "IEEE Photonics Technology Letters" 3(10), (1991), p. 921 ff.;

(5) C. Henry et al., Appl. Optics, 26(13), 1987, 2621, "Low Loss $Si_3N_4$—$SiO_2$ Optical Waveguides on Si";

(6) J.Appl.Phys. 71(9), (1992), p. 4136, Graüpner et al.;

(7) D-E-A-41 37 606;

(8) "Plasma-Impulse CVD Deposited $TiO_2$ Waveguiding Films: Properties and Potential Applications in Integrated Optical Sensor Systems", Mat.Res.Soc., Spring Meeting San Francisco, 1992, Conference publication;

(9) "Magnetron sputtering deposited AlN waveguides: Effect of the structure on optical properties", A. Cachard et al., Vacuum 41/numbers 4–6/p. 1151 to 1153/1990;

(10) Applied Optics, Vol. 14, No. 9, September 1975, New York, US, p. 2194–2198, Ingrey et al., "Variable Refractive Index and Birefringent Waveguides by Sputtering Tantalum in O2/N2 Mixtures";

(11) Journal of Vacuum Science and Technology, Vol. 11, No. 1, January 1974, New York, US, p. 381–384, Westwood et al., "Effect of Pressure on the Properties of Reactively Sputtered Ta2O5";

(12) Journal of Electronic Materials, Vol. 3, No. 1, 1974, US, p. 37–50, Cheng et al., "Losses in Tantalum Pentoxide Waveguides";

(13) Proceedings of the Spie: Hard Materials in Optics, Vol. 1275, Mar. 14, 1990, The Hague, NL, p. 75–79, Howson et al., "The Reactive Sputtering of Hard Optical Films of Tin Oxide";

(14) Journal of Vacuum Science and Technology: Part A, Vol. 2, No. 2, April 1984, New York US, p. 1457–1460, Demiront et al., "Effects of Oxygen in Ion/Beam Sputter Deposition of Titanium Oxides";

(15) Surface and Coatings Technology, Vol. 49, No. 1–3, Dec. 10, 1991, Lausanne, p. 239–243, Martin et al., "Deposition of TiN, TiC, and TiO2 Films by Filtered Arc Evaporation".

It is known from (9) to deposit metal nitride layers or films by means of reactive DC-sputtering, namely layers of AlN. As optical waveguiding layers such layers are reported to have optical losses of about 11 dB/cm at minimum, at a wave-length of light of 633 nm and in the $TE_0$-mode. Such layers are also reported to show optical losses down to 5 dB/cm.

It is known from (4) to manufacture $TiO_2$ which, applied as material of a waveguiding layer, exhibits optical losses lower than 10 dB/cm. Thereby it is not specified for which wave-mode and for which wave-length of light such losses are valid. From this reference it is further known to apply $Ta_2O_5$ for waveguiding layers which exhibit optical losses of less than 5 dB/cm, which losses are again neither specified with respect to wave-lengths of light nor with respect to propagation mode. The layers are here produced by an ion plating technique.

In agreement with the contents of (4), even in the year 1991, the reference (7) teaches that $TiO_2$ would be most suited as a material to produce thin film optical waveguides due to its physical and chemical properties. In spite of titanium oxide exhibiting a very high index of refraction, a good chemical resistance and being very hard, it is reported that no method had been known in the literature for producing a low loss titanium oxide thin film waveguide, because of, the fact that titanium oxide exhibits a high tendency toward crystallization during manufacturing.

Therefore the reference (7) proposes to deposit $TiO_2$ as a material suited as optical waveguiding material by means of a pulsed micro-wave plasma CVD-method. When applied as a material for waveguiding purpose, the $TiO_2$ produced by the method proposed in (7) exhibits for $TE_{01}$-waves of a wave-length, optical losses of about 2.5 dB/cm.

With respect to wave-lengths it is principally valid that the optical losses become the larger, the shorter the wave-length selected.

From the reference (2) it is further known to produce $Al_2O_3$-layers by ion beam sputtering, exhibiting low optical losses, lower than 1 dB/cm, with no propagation mode and no wavelength of light specified. Due to the proposed ion beam technology, the proposed manufacturing method is not suited for large areal coating and exhibits a relatively low coating rate. This in combination results in an accordingly uneconomic layer production.

The reference (3) proposes to use as a material for optical waveguiding layers, Rf-sputtered glass. The reference (5) further proposes to produce a material which is suited for waveguiding applications by means of low pressure plasma CVD followed by a heat treatment annealing step.

The reference, (8) further proposes to produce $TiO_2$ by means of plasma impulse CVD, which material, applied for monomode waveguiding in the $TE_0$-mode, exhibits optical losses of 2.4 dB/cm or of 5.1 dB/cm in the $TM_0$-mode, each referred to the wave-length of light of 633 nm.

In spite of the knowledge out of reference (9), the reference (6) still describes that reactive sputtering of metal nitride layers, namely of AlN, from metallic target results in layers which, applied as optical waveguiding layers, exhibit very high optical losses of 300 dB/cm at propagation conditions which are not specified. Such a material is, in fact, not any more an optical layer material due to its extremely high optical losses and may especially not be said to be suited for optical waveguiding.

Other metal oxides such as $TiO_2$ in reference (7), would be suited as optical layer material, whereby known methods for producing layers of such materials, as e.g. ion beam sputtering according to reference (2), micro-wave plasma CVD according to reference (7), plasma impulse CVD according to reference (8), low pressure plasma CVD according to reference (5) or ion plating methods according to (4), are disadvantageous especially with respect to large areal coating and deposition rate, so that the wide-spread production of such layer materials is very difficult to reduce to practice in a commercially feasible manner.

The recognition published in reference (7), according to which $TiO_2$ has the tendency of crystallization during its production, is made, with respect to tantalum pentoxide, in reference (10), i.e. in the year 1975. According to (10), already in that year, reactive DC-diode sputtered optical waveguiding layers were proposed, sputtered in $N_2$- and $O_2$-gas mixture atmosphere. Thus in fact, some sort of tantalum oxinitride layers were proposed.

For deposition rates of approx. 0.4 Å/sec and at temperatures of about 200° C., there are reported optical losses in the $TE_0$- and the $TM_0$-modes. lower than or equal to 1 dB/cm at a wavelength of light of approx. 633 nm. Such results are attributed to the nitride addition to the sputtering atmosphere.

From the reference (11) of 1974, which is referred to in reference (10), it is known to produce $Ta_2O_5$-layers for thin film capacitors and for optical waveguides by means of reactive DC-diode sputtering in an $O_2$/Argon atmosphere. Different sputtering parameters are varied and losses of approx. 1 dB/cm are reported from the best layers thus produced. Thereby, the following dependencies are reported:

With rising sputtering pressure:
increase of the optical losses;
increase of coating rate;
reduction of coating temperature.

The temperatures reported in reference (11) are in a range between 160° C. and 350° C. at lower pressure of approx. $1.6 \cdot 10^{-2}$ mbar operating pressure and are about 180° C. at higher operating pressure of about $8 \cdot 10^{-2}$ mbar.

In reference (12), which is referred to in (10) as well as in (11) and which has in parts the same authors, comparisons are made between $Ta_2O_5$-layers produced by different methods, so e.g. deposited by reactive DC-sputtering or by metallic sputtering with thermal post oxidation at temperatures of between 550° C. and 650° C. For $Ta_2O_5$-layers deposited by reactive DC-sputtering, optical losses between 1 and 6 dB/cm are reported for the $TE_0$-mode, such layers being produced at a deposition rate of approx. 0.12 Å/sec and at deposition temperatures of 200° C.

In combining the references (12) up to (10), there may be seen the tendency of leaving the approach of manufacturing low loss tantalum pentoxide layers and trying to manufacture such layers rather from Tantaloxinitride, deposited by reactive diode-DC-sputtering at relatively low deposition rates and at relatively high deposition temperatures.

The reference (13) further describes production of $SnO_2$-layers by DC-sputtering. The measuring results published in this reference lead to the conclusion that the optical losses will be in the range of $3 \cdot 10^4$ dm/cm.

From (14) it is further known to produce $TiO_2$-layers by means of ion beam sputtering. A rough estimate of the optical losses from the published measuring results leads to such losses in the range of 400 dB/cm.

Finally, the reference (15) describes to produce TiN-, TiC- and $TiO_2$-layers by means of arc evaporation. From the extinction coefficient which is reported for $TiO_2$-layer material of 0.07 at a wave-length of 633 nm, very high optical losses may be expected.

SUMMARY OF THE INVENTION

It is a first object of the present invention to provide a material for optical layers of a metal oxide, production of which may be significantly less expensive, which exhibits low optical losses, which further may be produced at lower temperatures compared with temperatures at which such known layer materials are produced.

This object is realized by an optical film material of a metal oxide being deposited by reactive magnetic field enhanced DC-sputtering from a metallic target and having optical losses of 15 dB/cm at the most for a wave-length of light of 633 nm.

By reactive magnetic field enhanced DC-sputtering, the expected low optical losses are maintained and, additionally, high deposition rates at low deposition temperatures are reached. Under the expression "magnetic field enhanced sputterings" all DC-sputtering techniques shall be understood, at which lines of magnetic flux are generated, which loop in a tunnel-like pattern across the target surface and/or which loop from the target surface to neighbouring parts of a processing chamber. An especially preferred example of such magnetic field enhanced DC-sputter techniques is magnetron DC-sputtering.

It is a further object of the present invention to provide such optical layer material of further reduced optical losses, which is realized by reducing the optical losses mentioned to 4 dB/cm at the most.

It is a further object of the present invention to provide said optical film material with high chemical resistance and with high hardness, which object is achieved by the optical film material mentioned above, being $TiO_2$, with even further reduced losses of 1.5 dB/cm at the most.

The last mentioned object of the present invention is further realized, too, by providing the optical film material mentioned, as tantalum pentoxide, with reduced optical losses of 3 dB/cm at the most.

It is a further object to provide the optical film material of metal oxide mentioned above with even further reduced losses, which is realized by such a material having optical losses at the wave-length mentioned of 1.5 dB/cm at the most.

Following the further object to even further reduce the optical losses as specified, it is proposed to provide the optical film material of metal oxide with optical losses of 0.7 dB/cm at the most or even of 0.3 dB/cm at the most.

It is a further object of the present invention to propose the mentioned optical film material so that it may be produced in a controlled process in the sense that arcing, as may occur in reactive DC-sputter deposition of metal oxide, may strictly be maintained under control. This object is realized by the mentioned optical film material being deposited by time-intermittent reactive magnetic field enhanced DC-sputtering.

It is a further object of the present invention to provide an optical film material as mentioned above which is produced economically, which is resolved by the material of the inventive optical film being deposited with a deposition rate of 0.5 Å/sec at the minimum and even with a deposition rate of 0.9 Å/sec at the minimum.

It is a further object of the present invention to propose an optical film material which is deposited so that e.g, a. substrate, whereon it is deposited, is not affected by the deposition process. This object is realized by such material being subjected to a deposition temperature of 150° C. at the most and even to a deposition temperature of 100° C. at the most and, in a further improved embodiment, to a deposition temperature of 70° C. at the most.

It is a further object of the present invention to provide $TiO_2$-material exhibiting very low optical losses, which object is realized by $TiO_2$ having optical losses of 1.5 dB/cm at the most for a wave-length of light of 633 nm. Thereby, an even improved $TiO_2$ exhibits optical losses at the said wave-length of light of 0.7 dB/cm at the most and even of 0.3 dB/cm at the most.

It is a further object of the present invention to provide a $Ta_2O_5$-material with optimized optical losses, which is realized by $Ta_2O_5$ wherein the optical losses for light of the wave-length of 633 nm are 3 dB/cm at the most.

Thereby, an even further improved $Ta_2O_5$ is proposed, wherein the optical losses specified above are 1.5 dB/cm at the most or even in a further improved material are 0.7 dB/cm or even 0.3 dB/cm at the most.

It is a further object of the present invention to provide an optical layer which is produced in an economically satisfying manner and is thus producible on a large scale. This object is achieved by an optical layer made of an optical layer material of a metal oxide, being deposited by reactive magnetic field enhanced DC-sputtering of a metallic target and having optical losses of 15 dB/cm at the most for light of the wave-length of 633 nm.

The object of even further reducing the optical losses of such optical layers is achieved by providing $TiO_2$ as layer material with optical losses being 1.5 dB/cm at the most or even being 0.7 dB/cm at the most.

Following the object of further improving the optical layer mentioned above and providing for a further layer material to that target, said optical layer of tantalum pentoxide is proposed with optical losses of 3 dB/cm at the most or even with such losses of 0.7 dB/cm at the most.

It is a further object of the present invention to construe by means of the optical layer mentioned above an optical multi-layer system. This is realized by the optical layer mentioned above within an optical multi-layer with at least one optical layer of lower refractive index material and at least one optical layer of higher refractive index material, whereby the optical layer which is deposited by reactive magnetic field enhanced DC-sputtering is the higher refractive index material layer.

It is a further object of the present invention to provide the optical layer mentioned above as an optical waveguiding layer which is achieved by that optical layer, being an optical waveguiding layer with the low optical losses specified above, being valid in a TM-monomode, especially in the $TM_0$-mode.

In a preferred embodiment for a large number of applications, the inventive optical layer is a substantially flat optical waveguiding layer.

It is a further object of the present invention to propose a method for producing a layer of a metaloxide resulting in economic production of such layers and in layers with low optical losses. This is realized by a method for producing a layer of metaloxide with optical losses of 15 dB/cm at the most for light of a wave-length of 633 nm, which method comprises magnetic field enhanced reactive DC-sputter deposition of the layer.

In a first preferred way of execution, the inventive method is performed by the mentioned sputtering realized in the oxide mode. To fulfil the object of further optimizing the inventive method of production, performing the reactive magnetic field enhanced DC-sputtering, is made in the instable transition mode (between metallic mode and oxide mode) and the transition mode of processing is stabilized to lead to a stable processing working point.

Thereby, it is further proposed to perform the magnetic field enhanced reactive DC-sputtering in a time-intermittent manner, preferably in a time-intermittent manner at a frequency of 30 kHz at the most and in a further preferred manner at a frequency of 20 kHz at the most.

All magnetic field enhanced reactive DC-sputtering mentioned up to now is preferably performed as magnetron sputtering.

Further objects and their solutions will become apparent to the man skilled in the art by the wording of the claims and of the following description of the invention.

The invention is, additionally to the following examples and the above general description, insofar as may be necessary for the man skilled in this specific art, described by means of one drawing.

The invention will thus be better understood and objects other than those set forth above will become apparent when consideration is given to this drawing, the description thereof and the described examples.

BRIEF DESCRIPTION OF THE DRAWING

The sole FIGURE shows schematically and in function block representation an apparatus as a preferred tool for manufacturing the inventive film material, the inventive $TiO_2$ or $Ta_2O_5$, and for performing the inventive method.

DESCRIPTION OF THE PREFERRED EMBODIMENTS

The inventive material is deposited by a magnetic field enhanced reactive plasma DC-sputter process, e.g. with processing apparatus as known from the EP-A-0 347 567, the U.S. Pat. No. 4,863,594, the DE-A-37 00 633, the U.S. Pat. Nos. 4,693,805, 4,692,230 or the EP-A-0 501 016.

In a preferred mode and as described in the EP-A-0 508 359, according to the U.S. application Ser. No. 07/865,116, deposited Apr. 8, 1992, by the same applicant as the present application, the sputter deposition process is performed with a process working point in the transition mode between metallic mode and oxidic mode.

The EP-A-0 508 359 and its US counterpart application are thus integrated in the present description by reference, with respect to sputter deposition in the transition mode.

Today, there is used a plant for the inventive manufacturing of the inventive material, a BAK 760, of applicant with cylindric, rotated carrier for substrates to be coated and with a rectangular planar magnetron as DC-sputter source. The process is performed as described in the EP-A-0 508 359 and its US counterpart application in the transition mode, which is, per se, instable. The working point is stabilized in this instable mode by means of negative feedback control.

A gas feed line 3 abuts in a vacuum chamber 1. A working gas, which comprises a reactive gas or possibly a reactive gas mixture, is inlet into the chamber 1 via said gas feed line 3. In the case of the preferred production of $TiO_2$- or of $Ta_2O_5$-material, there is fed $O_2$ and e.g. Argon into the chamber 1. As schematically shown, there is provided a sputtering source 5, and a magnetic field $\overline{B}$ is applied in a tunnel-like pattern across the sputter source 5 or with lines of force extending in a bent manner from the sputter surface of the source 5 to and on adjacent parts of the vacuum chamber 1. In a preferred mode, the sputter source 5 and the magnetic field associated thereto is realized by a magnetron, where the magnetic field $\overline{B}$ is kept stationary with respect to the surface being sputtered of the target or is moved relatively thereto.

From the sputtering source 5, the metal phase of the reaction product which is deposited on workpiece 9 is sputtered-off, thus, in the case of the preferred $TiO_2$ or $Ta_2O_5$, preferably a high percentage pure Ti— or Ta— metal.

Between the sputtering source 5, acting as a cathode, and an anode 7, there is generated a plasma discharge PL by means of a DC signal generator 11. The DC generator 11 is in one preferred embodiment coupled to the electrodes 7 and 5, the latter defining the plasma discharge area, via a discharge control unit 13, as shown in the FIGURE in a dashed manner. The unit 13, if provided, comprises a control input E and connects the electric tabs or terminals of said electrodes 7 and 5 to a predetermined repetition rate, according to a repetition frequency $f_r$, and for respectively predetermined time spans to a low ohmic current path, in unit 13 which latter is realized, as an extreme, as a short circuiting current path.

The values of the entities $\tau$ and $f_r$ may be stationarily set. Thereby, occurrence of stochastically time and position distributed arcing, as may occur due to deposition of electrically isolating depositions on the sputter surface of sputter source 5, may thereby be monitored, The rate of appearance of such arcing and/or arcing intensity is monitored with a sensor 15, the output signal thereof being compared at a comparator unit 17 with a predetermined and selected rated rate value and/or intensity value. According to the result of the comparison at the unit 17, a negative feedback adjustment is performed on the time-span $\tau$ of low ohmic connection of the tabs to the electrodes 5 and 7 and/or of the repetition rate according to $f_r$, which adjustment is performed via control input E.

If arcing occurs too frequently in the chamber 1 and/or too intensively, the time-span $\tau$ and/or the repetition rate $f_r$ are increased in negative feedback control manner, so as to reduce said arcing frequency and/or intensity.

By means of low ohmic interconnection at the unit 13, one counteracts deposition of charged particles on electrically isolating depositions, especially on the sputtered-off surface (target surface) of sputtering source 5.

Instead of monitoring arcing as a measured value for negative feedback control, it is absolutely possible, if at all unit 13 is provided, to measure the current which flows through the low ohmic current path intermittently installed at unit 13 or its time-course as a measured negative feedback control value to be compared with a rated value.

With a plant operated in the transition mode, as described in the EP-A-0 508 359 and its corresponding US application, and without provision of unit 13 of the FIGURE, the following materials were produced as follows:

Vacuum chamber: Diffusion pumped cubic chamber with 5"×25" target, planar magnetron, target material of 99.99% metal, target to substrate distance 7 cm, rotating substrates, substrate: Herasil (trademark).

1ST EXAMPLE

| $TiO_2$: | (a) | (b) |
|---|---|---|
| Electric power: | 10 kW | 6 kW |
| Ar pressure: | 8E-4 mbar | 8E-4 mbar |
| Ar flow: | 70 sccm | 71 sccm |
| $O_2$ partial pressure: | 1.5E-4 mbar | 1.8E-4 mbar |
| $O_2$ flow: | 38.1 sccm | 28 sccm |
| Ti intensity: | 20% | 24% |
| Target voltage in | −595 V | −595 V |

| $TiO_2$: | (a) | (b) |
|---|---|---|
| metallic mode: | | |
| Target voltage at processing working point: | −560 V | −550 V |
| Layer deposition rate: | 1 Å/sec | 0.25 Å/sec |

Results

| | | |
|---|---|---|
| Refractive index for light of a wave-length of 633 nm: | 2.42 | 2.42 |
| applied as optical waveguiding layer with a thickness of: | 75.5 nm | 112 nm |
| Optical loss at 633 nm in the $TM_0$-mode: | 0.77 dB/cm | 0.6 dB/cm |
| Substrate temperature: | ≦70°C. | ≦70°C. |

2ND EXAMPLE

| $Ta_2O_5$: | |
|---|---|
| Electrical power: | 6 kw |
| Ar pressure: | 2E-3 mbar |
| Ar flow: | 50 sccm |
| $O_2$ partial pressure: | 8E-4 mbar |
| $O_2$ flow: | 50 sccm |

Results

| | |
|---|---|
| Refractive index at 633 nm | 2.11 |
| applied as optical waveguiding layer with a thickness of: | 91.8 nm |
| Optical loss in the $TM_0$-mode at a wave-length of 633 nm | 0.7 dB/cm |
| Substrate temperature: | ≦70° C. |

3RD EXAMPLE

Production of $TiO_2$ with provision of unit 13 according to the FIGURE:

| | |
|---|---|
| Electrical power: | 5 kW |
| Ar pressure: | 3E-3 mbar |
| Ar flow: | 38.23 sccm |
| $O_2$ partial pressure: | 1.2E-3 mbar |
| $O_2$ flow: | 36 sccm |
| Ti intensity: | 26% |
| Target voltage in metallic mode: | −630 V |
| Target voltage at processing working point: | −554 V |
| Frequency of intermittent operation at unit 13: | 43 kHz |
| Deposition rate: | 0.94 Å/sec |

Results

| | |
|---|---|
| Applied as optical waveguiding layer with a thickness of: | 89.2 nm |

| | |
|---|---|
| Optical losses at light with a wave-length of 633 nm in the $TM_0$-mode: | 0.7 dB/cm |

As a conclusion, the inventors believe that a further optimized realization of the present invention will lead to optical losses as specified of 0.3 dB/cm at the most.

What is claimed is:

1. A method for producing a waveguide with a substrate and an optical waveguiding film on the substrate, the optical waveguiding film being made of a metal oxide with optical losses along the film of at most 15 dB/cm for light with a wavelength of 633 nm, comprising:

magnetic field enhanced reactive DC-sputtering of the film onto the substrate.

2. The method of claim 1, comprising the step of magnetic field enhanced reactive DC-sputtering said film from a metallic target.

3. The method of claim 1 comprising the step of performing said magnetic field enhanced reactive sputtering in a reactive mode.

4. The method of claim 1 comprising the steps of performing said reactive magnetic field enhanced DC-sputtering in an instable transition mode and stabilizing said sputtering in said transition mode.

5. The method of claim 1, comprising the step of performing said magnetic field enhanced reactive DC-sputtering in a time-intermittent manner.

6. The method of claim 5, comprising performing said sputtering intermittently with a frequency of 30 kHz at most.

7. The method of claim 5, comprising performing said intermittent sputtering at a frequency of 20 kHz at most.

8. The method of claim 1 comprising performing said magnetic field enhanced reactive DC-sputtering by magnetron sputtering.

9. The method of claim 1 comprising the step of sputter-depositing $TiO_2$ or $Ta_2O_5$.

10. The method of claim 1 comprising producing said film with said optical losses of 4 dB/cm at most.

11. The method of claim 1 comprising the step of depositing a $TiO_2$ film, said losses being 1.5 dB/cm at the most, or comprising the step of depositing a $Ta_2O_5$ film, said losses being 3 dB/cm at most.

12. The method of claim 11 comprising the step of depositing said film with optical losses of 1.5 dB/cm at most.

13. The method of claim 11 comprising the step of depositing said film with optical losses of 0.7 dB/cm at most.

14. The method of claim 11, comprising the step of depositing said film with optical losses of 0.3 dB/cm at most.

15. The method of claim 1 comprising the step of applying between said target and a counter electrode a DC-current source and intermittently connecting said counter electrode and said target by a current path of reduced resistance.

16. The method of claim 15, comprising at least one of the steps of measuring a current through said current path of reduced resistance and monitoring arcing during layer deposition to obtain a measured control value, comparing said measured value with a rated value, and adjusting a repetition rate of installing said current path of reduced resistance as a function of the result of the comparison.

17. The method of claim 1 comprising the step of depositing said material at a deposition rate of at least 0.5 Å/sec.

18. The method of claim 17, comprising the step of depositing said material at a deposition rate of at least 0.9 Å/sec.

19. The method of claim 1 comprising maintaining said substrate on which said material is deposited during deposition of said material at a temperature of 150° C. at most.

20. The method of claim 19 comprising maintaining said substrate on which said material is deposited during said deposition at a temperature of 100° C. at most.

* * * * *